United States Patent [15] 3,689,503
Reynolds et al. [45] Sept. 5, 1972

[54] INDOLE-2-CARBOXYLATES
[72] Inventors: Brian E. Reynolds, Dresher, Pa. 19025; John R. Carson, Norristown, Pa. 19401
[73] Assignee: McNeil Laboratories, Inc.
[22] Filed: July 30, 1970
[21] Appl. No.: 64,925

Related U.S. Application Data

[60] Division of Ser. No. 828,727, May 28, 1969, which is a continuation-in-part of Ser. No. 734,532, June 5, 1968, abandoned.

[52] U.S. Cl. ..............................260/326.13 R, 260/239 BC, 260/239 3T, 260/326.14 R, 424/244, 424/274
[51] Int. Cl. .............................................C07d 27/56
[58] Field of Search ............260/326.13 R, 326.14 R

[56] References Cited

OTHER PUBLICATIONS

Bell et al. Chem. Abs. 44:604 (1950).

Primary Examiner—Alex Mazel
Assistant Examiner—Joseph A. Narcavage
Attorney—Robert L. Minier and Salvatore R. Conte

[57] ABSTRACT

Compounds of the class of 2,3,4,5-tetrahydro-1H-1,4-diazepino[1,2a]indoles useful for their pharmacological properties and novel intermediates used in the syntheses thereof.

6 Claims, No Drawings

INDOLE-2-CARBOXYLATES

This is a divisional application of my co-pending application Ser. No. 828,727, filed May 28, 1969, which in turn is a continuation-in-part of application Ser. No. 734,532, filed June 5, 1968, now abandoned.

SUMMARY:

An object of this invention is to provide a novel class of diazepinoindoles, in particular, 2,3,4,5-tetrahydro-1-oxo-1H-1,4-diazepino[1,2a]indoles and the corresponding reduced and 2-lower alkanoyl derivatives thereof.

DESCRIPTION OF THE PREFERRED EMBODIMENTS:

The novel 2,3,4,5-tetrahydro-1H-1,4-diazepino[1,2a]-indoles of this invention may be structurally represented by the following formulas:

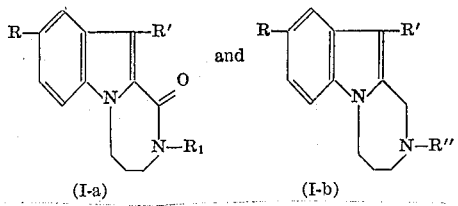

wherein R is a member selected from the group consisting of hydrogen, lower alkoxy, chloro and fluoro, R' is a member selected from the group consisting of hydrogen, lower alkyl and phenyl, $R_1$ is a member selected from the group consisting of hydrogen, lower alkyl, di-(lower alkyl)-amino-lower alkyl, di-(lower alkyl)-amidomethyl, benzyl and p-tolylmethyl, and R'' is a member selected from the group consisting of hydrogen, lower alkyl, di-(lower alkyl)-amino-lower alkyl, benzyl, p-tolylmethyl and lower alkanoyl. The therapeutically active, non-toxic acid addition salts of the foregoing basic nitrogen containing compounds are also embraced within the scope of this invention, as are several novel intermediates used in the syntheses of said compounds (I-a).

As used herein, "lower alkyl," "lower alkoxy" and "lower alkanoyl" may be straight or branch chained saturated hydrocarbons having from one to about six carbon atoms, such as for example, methyl, ethyl, propyl, isopropyl, butyl, pentyl, hexyl and the like alkyls, and respectively, the corresponding alkoxys such as methoxy, ethoxy, propoxy, isopropoxy, butoxy, etc., and alkanoyls such as formyl, acetyl, propionyl, isopropionyl, butyryl, etc.

The therapeutically active non-toxic acid addition salts of the basic nitrogen containing compounds are prepared by treatment with an appropriate acid such as an inorganic acid, e.g., hydrochloric, hydrobromic, hydriodic, sulfuric, nitric, phosphoric and the like; or an organic acid such as acetic, propionic, glycolic, lactic, pyruvic, malonic, succinic, maleic, malic, fumaric, tartaric, pamoic, citric, benzoic, mandelic, cinnamic, cyclohexylsulfamic, methane sulfonic, benzene sulfonic, salicylic, 2-phenoxy-benzoic and the like. Conversely, the salt form may be converted in the usual manner into the free base by treatment with alkali.

The 1-oxo diazepinoindoles of formula (I–a) demonstrate blood pressure lowering properties upon intravenous administration in anesthetized dogs. For example, a decrease in blood pressure of about 30–70 mm. Hg is generally observed upon I.V. administration of 10 mg/kg body weight.

The compounds of formula (I–a), wherein $R_1$ is hydrogen, may be obtained by the following processes. For example, a lower alkyl 1-(3-acetamidopropyl)-indole-2-carboxylate of formula (II) may be cyclized in the presence of a suitable base such as sodium hydride in a suitable high boiling solvent such as xylene, preferably under reflux conditions, to yield the corresponding formula (I-a) compounds with $R_1$ equal to hydrogen. Alternatively, these compounds may be prepared by cyclization of a lower alkyl 1-(3-aminopropyl)-indole-2-carboxylate of formula (III) using a base such as sodium ethoxide in a solvent such as ethanol. The foregoing reaction schemes may be illustrated by the following diagram in which the symbols R and R' have the same meaning previously indicated:

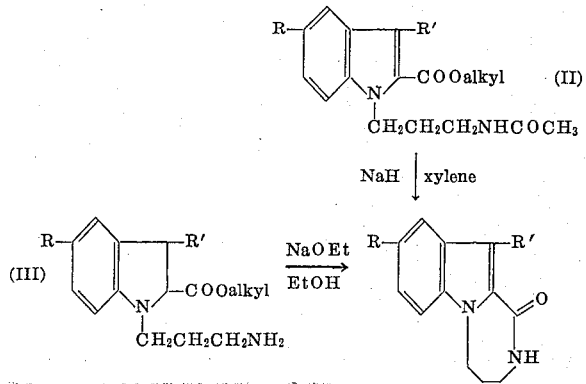

Conventional alkylation of the thus-obtained 2-unsubstituted 1-oxo-diazepinoindole with an appropriate alkylating agent affords the other compounds of formula (I–a) wherein $R_1$ is other than hydrogen. Alkylation is readily achieved by first producing the corresponding anion by treatment with a suitable base, e.g., an alkali metal hydride, amide or alkoxide such as sodium hydride, sodamide and potassium t-butoxide, respectively, followed by treatment with an appropriate alkylating agent of the formula X-R''', wherein X is chloro or bromo and R''' is the same as $R_1$ except for hydrogen, such as a lower alkyl halide, a di-(lower alkyl)-amino-lower alkyl halide, a di-(lower alkyl)-amidomethyl halide, a benzyl halide or a p-tolylmethyl halide. The alkylation may be carried out in a variety of polar or nonpolar solvents such as the lower alkanols, e.g., methanol, ethanol and the like; ethers such as diethyl ether, dioxane and the like; dimethylformamide; or aromatic hydrocarbons such as benzene, toluene, xylene and the like. The foregoing alkylation procedure may be illustrated as follows:

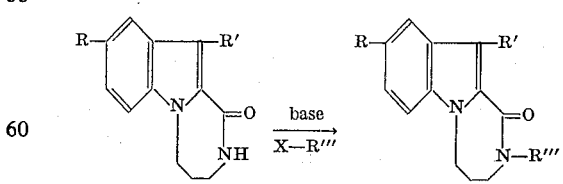

The compounds of formula (I–b), wherein R'' is hydrogen, lower alkyl, di-(lower alkyl)-amino-lower alkyl, benzyl or p-tolylmethyl, are readily obtained by reduction of the oxo function of the corresponding compounds of formula (I–a), i.e., where $R_1$ is other than di-(lower alkyl)-amidomethyl. The reduction is carried out according to conventional techniques, for example, by treating the appropriate formula (I–a) compound with a suitable reducing agent such as lithium aluminum hydride, preferably under reflux conditions for about 5–24 hours in a suitable organic-solvent such as 1,2-dimethoxy-ethane (monoglyme).

It is evident from the foregoing that the compounds of formula (I-a), wherein $R_1$ is other than di-(lower alkyl)-amidomethyl, in addition to their utility as blood pressure lowering agents, are useful as synthetic intermediates.

Conventional acylation of those compounds of formula (I–b), wherein R'' is hydrogen, affords the corresponding compounds of formula (I-b) in which R'' is lower alkanoyl. A lower alkanoic acid halide, preferably the chloride, or anhydride is employed as the acylating agent. With the former, a suitable base, such as an alkali metal carbonate, may be advantageously employed as an acceptor of the halogen acid produced during the reaction.

The compounds of formula (I–b) possess interesting and useful properties. For example, those compounds in which R and R' are as initially described and R'' is lower alkanoyl have been found to possess central nervous system depressant activity in laboratory animals, as demonstrated in mice by a decrease in motor activity at doses of 30–300 mg/kg i.p. and ataxia at about 100 mg/kg i.p. Those compounds in which R and R' are as initially described and R'' is lower alkyl, di-(lower alkyl)-amino-lower alkyl, benzyl or p-tolylmethyl possess blood pressure lowering properties, as demonstrated by a decrease of about 40–120 mm. Hg when administered I.V. to anesthetized dogs in a dose of 10 mg/kg body weight. Those compounds in which R and R' are as initially described and R'' is hydrogen have already been shown to be useful as starting materials for the corresponding 2-(lower alkanoyl) derivatives of formula (I–b). In addition, several of these 2-unsubstituted compounds have useful pharmacological properties. For example, when R is hydrogen or lower alkoxy, and R' and R'' are each hydrogen, pulmonary vasodilator properties are observed, similar to and equal in activity to about 50–70 percent of the pulmonary vasodilating activity of aminophylline upon I.V. administration to anesthetized dogs at a dose of 5 mg/kg body weight; and, when R is hydrogen or chloro, R' is lower alkyl, and R'' is hydrogen, a lowering of blood pressure in anesthetized dogs is observed of about 60–80 mm. Hg upon i.v. administration of 10 mg/kg body weight.

In view of their novelty and usefulness in the syntheses herein, the intermediate compounds of formula (II) constitute a further aspect of this invention, as do the intermediate compounds of formula (III) in which R' is phenyl.

The formula (II) compounds may be prepared by the reductive amidation of a corresponding lower alkyl 1-($\beta$-cyano-ethyl)-indole-2-carboxylate (IV), for example, by hydrogenating the latter in the presence of acetic anhydride using a catalyst such as Raney nickel. The intermediate compounds of formula (III) may be prepared by reduction of the nitrile function in the formula (IV) compounds, for example, with borane in a suitable organic solvent such as tetrahydrofuran or by hydrogenation using a catalyst such as Raney nickel in a solvent such as ethanol in the presence of a small amount of ammonia. The compounds of formula (IV), which also possess novelty when R' is phenyl, may be prepared by reacting a lower alkyl indole-2-carboxylate of formula (V) with acrylonitrile under standard cyanoethylation conditions, for example, in dioxane solution in the presence of a base such as benzyltrimethylammonium hydroxide. The foregoing reactions may be further illustrated by the following schematic diagram in which R and R' are as initially described:

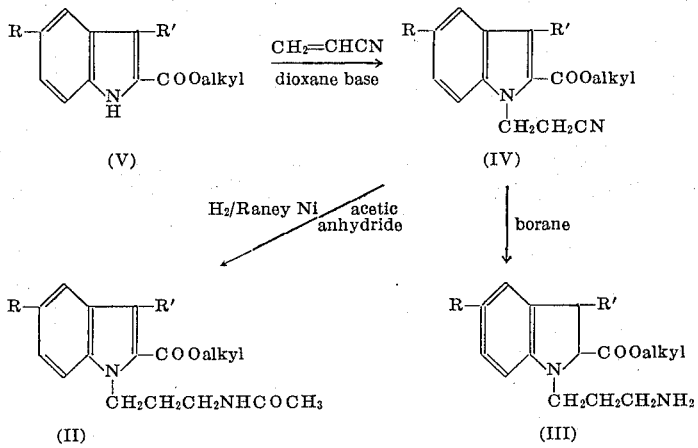

Several of the compounds of formula (V) are known, for example, those in which R is hydrogen, chloro or alkoxy and R' is hydrogen. In general, the formula (V) compounds may be prepared according to standard indole synthesis. For example, an acidified solution of an appropriate phenyl amine (VI) is diazotized with nitrous acid in the cold under standard diazotization conditions to yield the corresponding diazonium salt (VII) which is then treated with a compound of the formula:

in aqueous ethanol at room temperature for about two hours in the presence of a base such as sodium acetate or sodium hydroxide. The thus-obtained compound of formula (IX) is extracted with an aromatic hydrocarbon solvent, preferably benzene, which solvent is then evaporated off in vacuo to yield an oily residue of (IX) which is then dissolved in absolute ethanol and treated with a solution of HCl gas in absolute ethanol, preferably under reflux for about 1–5 hours, to yield the desired indole of formula (V). The foregoing reactions may be illustrated as follows:

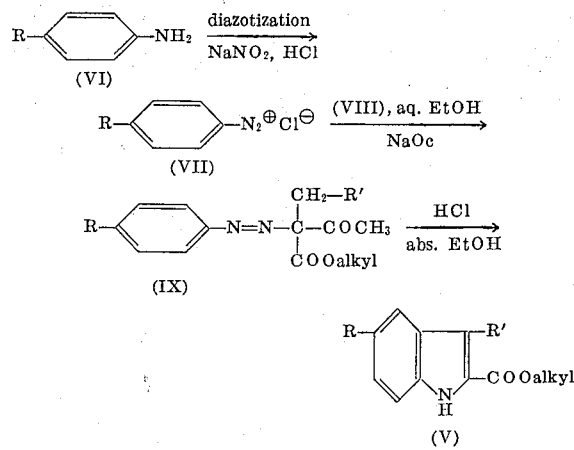

The following examples are intended to illustrate, but not to limit, the scope of the present invention.

EXAMPLE I

Ethyl indole-2-carboxylate (9.84 g., 0.052 mole) is dissolved in 150 ml. dioxane. Acrylonitrile (3.11 g., 0.0588 mole) and benzyltrimethylammonium hydroxide (Triton B) (2 ml.) are added and the mixture is warmed, with stirring, at 50°–55° C. for ¾ hr. The solution is cooled to room temperature and stirred overnight.

The reaction mixture is added to 500 ml. water containing 3 ml. glacial acetic acid. The mixture is extracted with methylene chloride, the organic layer washed with 2 × 25 ml. water and dried over magnesium sulphate. The solvent is removed under reduced pressure. The remaining oil is dissolved in ether and filtered through alumina with ether as eluant. Evaporation of the ether gives a solid. The product obtained is ethyl N- ($\beta$-cyanoethyl) indole-2-carboxylate; m.p. 84°–86 C.

EXAMPLE II

A 2.42 g. (0.01 mole) quantity of ethyl N-($\beta$-cyanoethyl) indole-2-carboxylate is suspended in acetic anhydride (20 ml.). The suspended compound is hydrogenated on a Parr shaker in the presence of Raney nickel. The uptake of hydrogen is complete after 1 ½ hrs. The product recovered is recrystallized from benzene-hexane. The product obtained is ethyl 1-(3-acetamidopropyl) indole-2-carboxylate; m.p., 83.5°–84.5° C.

EXAMPLE III

Ethyl 1-(3-acetamidopropyl) indole-2-carboxylate (1.44 g., 0.005 mole) is cyclized in the presence of sodium hydride (0.30 g., 0.00625 molar in hydride) in xylene under reflux. A few drops of absolute ethanol are added after 1 hr. reflux. Total reflux time is 2 hrs. The product recovered is crystallized from benzene-hexane. The product obtained is 2,3,4,5-tetrahydro-1H-1,4-diazepino [1,2-a] indol-1-one; m.p., 181°–183° C.

EXAMPLE IV

Ethyl N-($\beta$-cyanoethyl) indole-2-carboxylate (29 g., 0.12 mole) is dissolved in 200 ml. tetrahydrofuran and treated with 90 ml. (0.09 mole) of 1 molar borane solution in tetrahydrofuran. The reaction mixture is stirred for several hours at room temperature and then excess borane is decomposed by careful addition of absolute ethanol.

The reaction mixture is evaporated to dryness in vacuo and the oily residue is dissolved in absolute ethanol. The solution is treated with ethereal hydrogen chloride and heated under reflux for 1 hr. The solution is evaporated to dryness and the residue dissolved in water. The aqueous acid solution is extracted several times with ether and the organic solutions discarded. The aqueous solution is made alkaline with sodium bicarbonate and extracted with chloroform. The chloroform extracts are dried over magnesium sulphate and solvent removed to give an oil, the infrared spectrum of which shows no nitrile absorption. The product obtained is ethyl 1-(3-aminopropyl) indole-2-carboxylate.

As an alternative method, ethyl N-($\beta$-cyanoethyl) indole-2-carboxylate (35.2 g., 0.145 mole) is suspended in 900 ml. 5 percent ammonical ethanol and hydrogenated on a Parr shaker in the presence of Raney nickel. The product is recovered as an oil which shows no nitrile absorption in the infrared spectrum. The product is ethyl 1-(3-aminopropyl) indole-2-carboxylate.

EXAMPLE V

Ethyl 1-(3-aminopropyl) indole-2-carboxylate (25 g.) is dissolved in absolute ethanol and heated under reflux for several hours in the presence of a trace of sodium ethoxide. The solution is evaporated to dryness in vacuo and the residue suspended in water containing enough hydrochloric acid to give an acid reaction to pH paper. The mixture is extracted with chloroform (3 × 50 ml.), the combined extracts are washed once with water, dried over magnesium sulphate and solvent removed in vacuo. The residue is crystallized from chloroform-hexane to give 2,3,4,5-tetrahydro-1H-1,4-diazepino [1,2-a] indol-1-one; m.p. 181°–183° C.

EXAMPLE VI

A solution of methyl iodide (3.8 g., 0.040 mole) in dimethylformamide (15 ml.) is added to a stirred mixture of 2,3,4,5-tetrahydro-1H-1,4-diazepino [1,2-a] indol-1-one (7.2 g., 0.036 mole) and potassium t-butoxide (5.3 g.) in dimethylformamide (45 ml.). The mixture is stirred for an additional 2 hrs. and then diluted with water (150 ml.). The solid is separated by filtration. Recrystallization from acetone affords 2,3,4,5-tetrahydro-2-methyl-1H-1, 4-diazepino [1,2-a] indol-1-one; m.p. 145°–147° C.

EXAMPLE VII

Ethyl 5-methoxyindole-2-carboxylate (11 g., 0.05 mole) and acrylonitrile (3.0 g.) are dissolved in 125 ml. dioxane. Triton B (2 ml.) is added and the mixture is stirred at 55° C. for 3/4 hr., cooled to room temperature, and stirred overnight. The solution is poured into 500 ml. water containing 2 ml. glacial acetic acid. The aqueous mixture is extracted with methylene chloride (3 × 150 ml.); the combined organic layers are washed once with water and dried over magnesium sulphate. The solvent is removed under reduced pressure, followed by crystallization from benzene-hexane; m.p. 108°–109° C. The product, ethyl 5-methoxy-N-($\beta$-cyanoethyl) indole-2-carboxylate, is towered on alumina and recrystallized from chloroform-ether; m.p. 112°–112.5° C.

EXAMPLE VIII

Ethyl 5-methoxy-N-($\beta$-cyanoethyl) indole-2-carboxylate (15.0 g., 0.055 mole) is suspended in acetic anhydride (125 ml.) and hydrogenated on a Parr shaker over Raney nickel. The uptake of hydrogen ceases after 5 hrs.; the catalyst is removed by filtration and washed with absolute ethanol (200 ml). The filtrate is evaporated to dryness in vacuo. The residue is dissolved in chloroform and washed with sodium hydroxide solution and water. The solution is dried over anhydrous magnesium sulphate and the solvent is removed in vacuo. The residue is crystallized from benzene-hexane and affords ethyl 1- (3-acetamidopropyl)-5-methoxyindole-2-carboxylate; m.p. 99.5°–101° C.

EXAMPLE IX

Ethyl 1-(3-acetamidopropyl)-5-methoxyindole-2-carboxylate (3.18 g., 0.01 mole) is added to a stirred suspension of approximately 50 percent sodium hydride (0.65 g., 0.0137 molar in hydride) in dry xylene (40 ml.). The stirred mixture is heated under reflux for 6 hrs., and cooled to room temperature overnight. An equal volume of chloroform is added and the solution is washed twice with water, once with 2N hydrochloric acid, and again with water. The dried organic solution is evaporated under reduced pressure. Crystallization of the residue from chloroform-hexane affords 2,3,4,5-tetrahydro-9-methoxy-1H-1,4-diazepino [1,2-a] indol-1-one; m.p. 174°–176° C.

EXAMPLE X

Ethyl N-($\beta$-cyanoethyl)-5-methoxyindole-2-carboxylate (5.44 g., 0.02 mole) is dissolved in 35 ml. tetrahydrofuran. A solution of 16 ml. 1 molar borane in tetrahydrofuran solution is added slowly and the resulting mixture is stirred for several hours at room temperature. Excess borane is decomposed by careful addition of absolute ethanol. The solution is evaporated to dryness in vacuo. The oily residue is dissolved in absolute ethanol. The solution is treated with ethereal hydrogen chloride and heated under reflux for 1 hr. The solution is evaporated to dryness. The residue is dissolved in water and the aqueous solution is extracted with ether. The organic extracts are discarded. The aqueous solution is made alkaline with sodium bicarbonate and extracted with chloroform. The chloroform extracts are dried over magnesium sulphate and solvent is removed in vacuo. The infrared spectrum shows no nitrile absorption. The product obtained is ethyl 1(3-aminopropyl)-5-methoxy-indole-2-carboxylate.

EXAMPLE XI

Ethyl 1-(3-aminopropyl)-5-methoxyindole-2- carboxylate, 2.76 g. (0.01 mole), is dissolved in 25 ml. absolute ethanol and a solution of sodium ethoxide in ethanol added. The mixture is heated under reflux for 3 hrs., solvent is removed under reduced pressure and the residue is suspended in water containing enough hydrochloric acid to give an acid solution. The aqueous mixture is extracted with chloroform and the organics are dried over magnesium sulphate. The solvent is removed. Recrystallization from chloroform-hexane affords 2,3,4,5-tetrahydro-9-methoxy-1H-1,4-diazepino [1,2-a] indol-1-one; m.p. 175°–177° C.

EXAMPLE XII

Ethyl 5-chloroindole-2-carboxylate (5 g., 0.0224 mole) and acrylonitrile (1.5 g., 0.028 mole) are mixed with 30 ml. dioxane. Triton B (0.5 ml.) is added and the solution is stirred at 50°–55° C. for 1 ½ hrs., cooled to room temperature and stirred overnight. The reaction mixture is poured into water and acidified with glacial acetic acid. The aqueous mixture is extracted with chloroform; the extracts are washed with sodium bicarbonate solution, water, dried over magnesium sulphate and the solvent is removed in vacuo. The residue is crystallized from absolute ethanol to give ethyl 5-chloro-N-($\beta$-cyanoethyl) indole-2-carboxy-late; m.p. 91.5°–93° C.

EXAMPLE XIII

A 2.76 g. (0.01 mole) quantity of ethyl 5- chloroindole N-($\beta$-cyanoethyl)-2-carboxylate is suspended in acetic anhydride (20 ml.). The suspension is hydrogenated on a Parr shaker in the presence of Raney nickel catalyst. The uptake of hydrogen is complete after 2 ½ hrs. The material recovered is crystallized from benzene-hexane. The product obtained is ethyl 1-(3- acetamidopropyl)-5-chloroindole-2-carboxylate; m.p. 130.5°–131.5° C.

EXAMPLE XIV

Ethyl 1-(3-acetamidopropyl)-5-chloroindole-2-carboxylate (1.63 g., 0.005 mole) is cyclized in the presence of sodium hydride (0.30 g., 0.00625 molar in hydride) in xylene under reflux. A few drops of ethanol are added after 1 hr. reflux. The total reflux time is 2 hrs. The material recovered is crystallized from chloroform-hexane. The product obtained is 9-chloro-2,3,4,5-tetrahydro-1H-1, 4-diazepino-[1,2-a]-indol-1-one; m.p. 222°–223° C.

EXAMPLE XV

Ethyl N-($\beta$-cyanoethyl)-5-chloroindole-2-carboxylate (2.76 g., 0.01 mole) is dissolved in 20 ml. tetrahydrofuran and treated with 10 ml. 1 molar borane in tetrahydrofuran solution. The mixture is stirred for a further 2 hrs. and excess borane decomposed with absolute ethanol. The solution is evaporated to dryness in vacuo, dissolved in water and extracted with ether. The organic extracts are discarded. The aqueous solution is made alkaline with sodium bicarbonate and extracted with chloroform. The chloroform extracts are dried over magnesium sulphate and solvent is removed in vacuo. The infrared spectrum shows no nitrile absorption. The product obtained is ethyl 1-(3-aminopropyl)-5-chloroindole-2-carboxylate.

EXAMPLE XVI

Ethyl 1-(3-aminopropyl)-5-chlorindole2-carboxylate (50 g., 0.18 mole) is dissolved in absolute ethanol and heated under reflux for several hours in the presence of a trace of sodium ethoxide. The solution is evaporated to dryness in vacuo and the residue suspended in water containing enough hydrochloric acid to give an acid reaction to pH paper. The mixture is extracted with chloroform (3 × 50 ml.), the combined extracts are washed once with water, dried over magnesium sulphate and solvent removed in vacuo. Recrystallization from chloroformhexane affords pure 9-cloro-2,3,4,5-tetrahydro-1-H-1, 4-diazepino [1,2-a] indol-1one; m.p. 221°–223° C.

EXAMPLE XVII

Methyl iodide (3 ml., 4.5 g.) in 20 ml. dimethylformamide is added to a stirred suspension of 9-chloro-2,3,4,5-tetrahydro-1H-1,4-diazepino [1,2-a] indol-1-one (4.69 g., 0.02 mole) and potassium t-butoxide (3.0 g., 0.0267 mole) in 50 ml. dimethylformamide. It is necessary to keep the temperature of the reaction mixture below 35° C. by cooling in a water bath. The mixture is stirred at room temperature for 2 hrs. and then poured onto 250 ml. water. The solid which separates is removed by filtration. Recrystallization from acetone affords 9-chloro-2,3,4,5-tetrahydro-2-methyl-1H-1,4-diazepino [1,2-a] indol-1one; m.p. 188–189.5° C.

EXAMPLE XVIII

9-Chloro-2,3,4,5-tetrahydro-1H-1,4-diazepino-[1,2-a] indol-1one (2.82 g., 0.012 mole) is dissolved in dry dimethylformamide (30 ml.) and treated with potassium t-butoxide (1.8 g.). A solution of ethyl iodide (2.6 g., 0.0167 mole) in dimethylformamide (10 ml.) is added at such a rate as to keep the temperature below 35° C. The mixture is stirred for a further hour after addition is complete. The reaction mixture is poured onto 100 ml. water and the solid which separates is removed by filtration and is recrystallized from acetone. 9-Chloro-2-ethyl-2,3,4,5-tetrahydro-1H-1, 4-diazepino [1,2-a] indol-1-one is obtained; m.p. 183°–185° C.

EXAMPLE XIX

9-Chloro-2,3,4,5-tetrahydro-1H-1, 4-diazepino [1,2-a] indol-1-one (2.35 g., 0.01 mole) is dissolved in 25 ml. dry dimethylformamide and treated with potassium t-butoxide (1.5 g.). α-Bromo-p-xylene (2.5 g., 0.0135 mole) in 20 ml. dimethylformamide is added slowly with stirring at a temperature below 35° C. When addition is complete, the mixture is stirred for 3 hrs. at room temperature, poured onto water and filtered. The resulting solid is dissolved in chloroform; the solution is dried over magnesium sulphate and solvent is removed. The residue is recrystallized from acetone to give 9-chloro-2,3,4,5-tetrahydro-2-(p-tolyl) methyl-1H-1, 4-diazepino [1,2-a] indol-1-one; m.p. 147°–149° C.

EXAMPLE XX 2,3,4,5-Tetrahydro-9-methoxy-1H-1, 4-diazepino [1,2-a] indol-1-one (9.4 g., 0.04 mole) is added to a slurry of 2.4 g. of 50 percent sodium hydride (approximately 0.05 molar in sodium hydride) in 200 ml. toluene. The mixture is stirred under reflux for 2 hrs., and a solution of freshly distilled dimethylaminopropylchloride (7.29 g., 0.06 mole) in 50 ml. toluene is added. Heating is continued for 3 hrs., and the mixture is cooled to room temperature and stirred overnight. The precipitate is separated by filtration and the filtrate is evaporated to dryness. The oil formed is converted to the hexamate. This compound is recrystallized from absolute ethanol-ether. The product is 2-(dimethylaminopropyl)-2,3,4,5-tetrahydro-9-methoxy-1H-1, 4-diazepino [1,2-a] indol-1-one hexamate; m.p. 132°–134° C.

EXAMPLE XXI

A mixture of 9-chloro-2,3,4,5-tetrahydro-1H-1, 4-diazepino [1,2-a] -indol-1-one (5.3 g., 0.023 mole), potassium t-butoxide (3.4 g., 0.03 mole) and 30 ml. of dimethylformamide is stirred at room temperature. To the stirring solution, N, N-dimethyl chloroacetamide (3.6 g., 0.03 mole) in 25 ml. of dimethylformamide is added dropwise. The mixture is stirred an additional 1 ½ hrs. and then is treated with water. The solid is filtered and recrystallized from chloroform-hexane. The product obtained is 9-chloro-2,3,4,5-tetrahydro-N, N-dimethyl-1-oxo-1H-1, 4-diazepino [1,2-a] indole-2-acetamide; m.p. 183°–185° C.

EXAMPLE XXII

A suspension of 9-chloro-2,3,4,5 tetrahydro-1H-1, 4-diazepino [1,2-a] indol-1-one (4.69 g., 0.02 mole) and 1.2 g. 50 percent sodium hydride in toluene (120 ml.) is stirred under reflux for 2 hrs. Freshly distilled dimethylaminoethylchloride (3.22 g., 0.03 mole) in 10 ml. toluene is added. The mixture is heated under reflux for an additional 3 hrs. The mixture is cooled to room temperature, filtered, and the solvent is removed in vacuo. Ethereal hydrogen chloride is added to an ethanol solution of this solid. Several recrystallizations from ethereal ethanol are undertaken. The product obtained is 9-chloro-2-dimethylaminoethyl-2,3,4,5-tetrahydro-1H-1, 4-diazepino [1,2-a] indol-1-one hydrochloride; m.p. 236°–237° C.

EXAMPLE XXIII

By substituting an equivalent amount of the 1-oxo-diazepinoindole product obtained from Example V and Example XI for the 9-chloro-1-oxo-diazepinoindole used in Examples XXI and XXII, and repeating the procedures of the latter two examples, there are obtained as respective products:

2,3,4,5-tetrahydro-N,N-dimethyl-1-oxo-1H-1,4-diazepino[1,2a] indole-2-acetamide;
9-methoxy-2,3,4,5-tetrahydro-N,N-dimethyl-1-oxo-1H-1,4-diazepino[1,2a]indole-2-acetamide;
2-dimethylaminoethyl-2,3,4,5-tetrahydro-1H-1,4-diazepino[1,2a]indol-1-one hydrochloride; and
9-methoxy-2-dimethylaminoethyl-2,3,4,5-tetrahydro-1-H-1,4-diazepino [1,2a]indol-1-one hydrochloride.

EXAMPLE XXIV

The procedure of Example XIX is repeated except that an equivalent amount of benzyl bromide is used as the alkylating agent instead of α-bromo-p-xylene, and an equivalent amount of an appropriate diazepinoindole is used as the material to be alkylated, to yield the following products:

2,3,4,5-tetrahydro-2-benzyl-1H-1,4-diazepino[1,2a]indol-1-one;

9-methoxy-2,3,4,5-tetrahydro-2-benzyl-1H-1,4-diazepino[1,2-a]indol1-one; and 9-chloro-2,3,4,5-tetrahydro-2-benzyl-1H-1,4-diazepino[1,2-a]indol-1-one.

EXAMPLE XXV

A. Aniline (27.9 g., 0.3 moles) is dissolved in 300 ml. 15 percent hydrochloric acid and 300 g. ice and diazotized with a solution of sodium nitrite (22.5 g.) in 60 ml. ice water. The diazonium salt solution is added rapidly to a stirred mixture of ethyl α-ethylacetoacetate (50.6 g., 0.32 mole), 300 g. ice, 300 ml. absolute ethanol and 246 g. sodium acetate. The mixture is stirred for 2 hrs. and extracted with benzene. The benzene extract is washed with water, dried over magnesium sulphate and the solvent removed in vacuo. The residual oil is dissolved in 60 ml. absolute ethanol and treated with 150 ml. ethanolic hydrogen chloride. When the exothermic reaction has subsided, the mixture is heated under reflux for 2 hrs. and then cooled to room temperature. The mixture is diluted with water and the solid separated by filtration and triturated with chloroform. The chloroform mixture is dried and evaporated to give ethyl 3-methylindole-2-carboxylate as an off-white solid, m.p. 134.5°–136° C.

B. The procedure of Example XXV-A is repeated except that an equivalent quantity of ethyl α-benzylacetoacetate and ethyl α-propylacetoacetate is substituted for the ethyl α-ethylacetoacetate used therein to yield, as respective products, ethyl 3-phenylindole-2-carboxylate and ethyl 3-ethylindole-2-carboxylate.

EXAMPLE XXVI

A. Ethyl 3-methylindole-2-carboxylate (39.1 g., 0.192 mole) is dissolved in dioxane (250 ml.) followed by the addition of acrylonitrile (12 g., 0.22 mole) and Triton B (5 ml.). The mixture is stirred at 50°–60° C for 7 hrs. and then at room temperature overnight. The reaction mixture is poured into water made acidic with acetic acid. This mixture is extracted with chloroform and the chloroform extracts are washed with sodium bicarbonate and water, dried over sodium sulfate and evaporated in vacuo. The resulting oil is crystallized and recrystallized from aqueous ethanol to afford ethyl N-(β-cyanoethyl)-3-methylindole-2-carboxylate as a pale yellow solid (mp. 56.5°–58° C).

B. By substituting an equivalent quantity of each of the esters obtained from Example XXV-B in the cyanoethylation procedure described in Example XXVI-A, there are obtained, as respective products, the 3-phenyl and 3-ethyl derivatives of ethyl N-(β-cyanoethyl)-indole-2-carboxylate.

EXAMPLE XXVII

A. Ethyl 3-methyl-N-(β-cyanoethyl)indole-2-carboxylate (58.0 g., 0.22 mole) is suspended in acetic anhydride (400 ml.) and hydrogenated on a Parr shaker over Raney nickel. After the uptake of hydrogen ceases, the catalyst is separated by filtration and washed with absolute ethanol. The combined filtrates are evaporated to dryness in vacuo. The residue is dissolved in chloroform and washed with sodium hydroxide to remove any residual acetic anhydride and then washed with water. The chloroform layer is dried over magnesium sulfate and the solvent removed in vacuo. The residual material is dissolved in benzene (50 ml.) and chromatographed on Woelm neutral alumina. Elution with benzene-chloroform (1:1) affords ethyl 1-(3-acetamidopropyl)-3-methyl-2-carboxylate as a white solid, mp. 110°–113° C.

B. The reductive amidation procedure of Example XXVII-A is repeated using an equivalent quantity of each of the products obtained from Example XXVI-B to yield, as respective products, the 3-phenyl and 3-ethyl derivatives of ethyl 1-(3-acetamidopropyl)-indole-2-carboxylate.

EXAMPLE XXVIII

A. Ethyl 1-(3-acetylaminopropyl)-3-methylindole-2-carboxylate (20 g., 0.066 mole) is added to a suspension of sodium hydride (3.9 g., 0.16 mole) in dry xylene (280 ml.) and the mixture heated under reflux for 5 hrs. The reaction mixture is poured onto water and the resulting yellow precipitate is separated and dissolved in chloroform. The chloroform solution is washed with water, dried over magnesium sulfate and evaporated in vacuo. The resulting solid is recrystallized from chloroform-hexane to give 2,3,4,5-tetrahydro-11 methyl-1H-1,4-diazepino [1,2-a]indol-1-one as a white solid, mp. 221°–222° C.

B. In accordance with the cyclization procedure outlined in Example XXVII-A, except that an equivalent quantity of each of the esters obtained from Example XXVII-B is substituted for the ethyl 1-(3-acetylaminopropyl)-3-methylindole-2-carboxylate used therein, the following respective products are obtained:

2,3,4,5-tetrahydro-11-phenyl-1H-1,4-diazepino[1,2-a]indol-1-one; and 2,3,4,5-tetrahydro-11-ethyl-1H-1,4-diazepino[1,2-a]indol-1-one.

EXAMPLE XXIX

By repeating the procedure of Example XXV-A, except that an equivalent quantity of p-chloroaniline is substituted for the aniline used therein, ethyl 5-chloro-3-methylindole-2-carboxylate is obtained as the product, m.p. 163.5°–165° C.

EXAMPLE XXX

Ethyl 5-chloro-3-methylindole-2-carboxylate (38 g., 0.16 mole) is dissolved in dioxane (300 ml.), followed by the addition of acrylonitrile (10.8 g., 0.19 mole) and Triton B (5 ml.). The mixture is stirred at 50°–60° C for 4-½ hrs., then at room temperature overnight. The reaction mixture is poured into water made acidic with acetic acid. The resulting solid is filtered off and dissolved in chloroform and the chloroform solution is washed with sodium bicarbonate and water, dried over sodium sulfate, and evaporated in vacuo. The resulting oily residue is crystallized and recrystallized from ethanol to yield ethyl 5-chloro-N-(β-cyanoethyl)-3-methyl-indole-2-carboxylate as an off-white solid, m.p. 103°–105° C.

EXAMPLE XXXI

The method of Example XXVII-A is repeated except that ethyl 5-chloro-N-(β-cyanoethyl)-3-methylindole-2-carboxylate (24 g., 0.083 mole) is suspended in acetic anhydride (250 ml.). The uptake of hydrogen is complete after 5-½ hrs. Work-up of the reaction mixture gives an oil that is crystallized from aqueous ethanol to yield ethyl 1-(acetamidopropyl)-5-chloro-3-methylindole-2-carboxylate as a white solid in about 80 percent yield, m.p. 112°–114° C.

EXAMPLE XXXII

Ethyl 1-(acetamidopropyl)-5-chloro-3-methylindole-2-carboxylate (13.7 g., 0.041 mole) is added to a suspension of sodium hydride (2.1 g., 0.045 mole) in dry xylene (150 ml.) and the mixture is heated under reflux for 6 hrs. The reaction mixture is filtered and the filtrate evaporated. The residue obtained is stirred with water and extracted with chloroform. The chloroform extracts are washed with 2N hydrochloric acid, then water, dried over magnesium sulfate and evaporated in vacuo. The resulting yellow solid is recrystallized from aqueous ethanol to yield 9-chloro-2,3,4,5-tetrahydro-11-methyl-1H-1,4-diazepino[1,2-a]indol-1-one, m.p. 154°–155.5° C.

EXAMPLE XXXIII

The indole synthesis procedure described in Example XXV-A may be used to prepare the compounds of formula (V). Accordingly, by using equivalent quantities of an appropriately substituted aniline and an appropriately substituted acetoacetate, the following indoles are obtained:
methyl 5-fluoroindole-2-carboxylate;
ethyl 5-fluoro-3-methylindole-2-carboxylate;
ethyl 5-chloro-3-phenylindole-2-carboxylate;
methyl 5-ethoxy-3-ethylindole-2-carboxylate;
ethyl 5-methoxy-3-phenylindole-2-carboxylate; and
methyl 5-fluoro-3-ethylindole-2-carboxylate.

EXAMPLE XXXIV

By using an equivalent quantity of each of the indoles prepared in Example XXXIII in the cyanoethylation procedure described in Example XXVI-A, the following respective products are obtained:
methyl N-(β-cyanoethyl)-5-fluroindole-2-carboxylate;
ethyl N-(β-cyanoethyl)-5-fluoro-3-methylindole-2-carboxylate;
ethyl N-(β-cyanoethyl)-5-chloro-3-phenylindole-2-carboxylate;
methyl N-(β-cyanoethyl)-5-ethoxy-3-ethylindole-carboxylate;
ethyl N-(β-cyanoethyl)-5-methoxy-3-phenylindole-2-carboxylate; and
methyl N-(β-cyanoethyl)-5-fluoro-3-ethylindole-2-carboxylate.

EXAMPLE XXXV

The reductive amidation procedure of Example XXVII-A may be followed to prepare the acetamidopropyl indoles of formula (II). For example, by starting with an equivalent quantity of each of the indole esters obtained from Example XXXIV, the following respective products are obtained:
methyl 1-(3-acetamidopropyl)-5-fluoroindole-2-carboxylate;
ethyl 1-(3-acetamidopropyl)-5-fluoro-3-methylindole-2-carboxylate;
ethyl 1-(3-acetamidopropyl)-5-chloro-3-phenylindole-2-carboxylate;
methyl 1-(3-acetamidopropyl)-5-ethoxy-3-ethylindole-carboxylate;
ethyl 1-(3-acetamidopropyl)-5-methoxy-3-phenylindole-2-carboxylate; and
methyl 1-(3-acetamidopropyl)-5-fluoro-3-ethylindole-2-carboxylate.

EXAMPLE XXXVI

The cyclization procedure of Example XXVIII-A is repeated with an equivalent quantity of each of the indole esters obtained from Example XXXV to yield as respective products:
2,3,4,5-tetrahydro-9-fluoro-1H-1,4-diazepino[1,2a]indol-1-one;
2,3,4,5-tetrahydro-9-fluoro-11-methyl-1H-1,4-diazepino[1,2a]indol-1-one;
2,3,4,5-tetrahydro-9-chloro-11-phenyl-1H-1,4-diazepino[1,2a]indol-1-one;
2,3,4,5-tetrahydro-9-ethoxy-11-ethyl-1H-1,4-diazepino[1,2a]indol-1-one;
2,3,4,5-tetrahydro-9-methoxy-11-phenyl-1H-1,4-diazepino[1,2a]indol-1-one; and
2,3,4,5-tetrahydro-9-fluoro-11-ethyl-1H-1,4-diazepino[1,2a]indol-1-one.

EXAMPLE XXXVII

The alkylation procedures described in Examples XVII through XXII may be followed to prepare the N-alkylated derivatives of formula (I–a). Accordingly, by using equivalent quantities of an appropriate alkylating agent and an appropriate 1-oxo-2-unsubstituted diazepinoindole as the material to be alkylated, the following derivatives of 2,3,4,5-tetrahydro-1H-1,4-diazepino[1,2aindol-1-one are prepared:

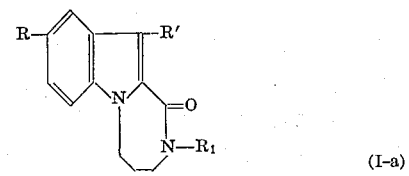

| Compound No. | R | R′ | $R_1$ |
|---|---|---|---|
| XXXVII-a | MeO | H | Et |
| " b | H | Me | Me |
| " c | H | Me | Be |
| " d | H | Ph | Me |
| " e | H | Me | $(Me)_2$N-Pr |
| " f | H | Et | p-tolyl-Me |
| " g | F | H | $(Me_2)$N-CO-Me |
| " h | F | Me | Me |
| " i | Cl | Ph | Et |
| " j | EtO | Et | Be |
| " k | MeO | Ph | $(Me)_2$N-Et |
| " l | F | Et | $(Me)_2$N-CO-Me |
| " m | Cl | Me | Be |
| " n | Cl | Me | p-tolyl-Me |
| " o | H | H | Et |
| " p | F | H | Bu |

EXAMPLE XXXVIII 2,3,4,5-tetrahydro-11-methyl-1H-1,4-diazepino[1,2-a]-indol-1-one (7.7 g., 0.036 mole) is added to a suspension of lithium aluminum hydride (1.6 g.) in dry monoglyme (250 ml.) and heated under reflux for 23 hrs. Ice is added to decompose any remaining lithium aluminum hydride. The precipitate is separated by filtration and washed with chloroform. The filtrate is evaporated in vacuo leaving a solid which is recrystallized from aqueous methanol to yield 6.5 g. (92 percent) of the free base, 2,3,4,5-tetrahydro-11-methyl-1H-1,4-diazepino[1,2a]indole (m.p. 92°–94° C). The hydrobromide salt, upon recrystallization from methanol-ether, has a m.p. of 258°–259° C.

EXAMPLE XXXIX 2,3,4,5-tetrahydro-1H-1,4-diazepino[1,2-a]indol-1-one (6.0 g., 0.03 mole) in 200 ml. of monoglyme is adapted dropwise to a stirred suspension of lithium aluminum hydride (2.8 g., 0.08 mole) in 220 ml. of monoglyme, and the mixture heated under reflux overnight. Water is added to the cooled mixture, and the mixture filtered. The filtrate is dried with anhydrous magnesium sulfate and concentrated in vacuo, giving an oil which solidifies on standing to give about 85 percent theoretical yield of the free amine, 2,3,4,5-tetrahydro-1H-1,4-diazepino[1,2a]indole, m.p. 75°–77 L C. The hexamate, recrystallized from methanol-ether is an off-white solid, m.p. 170°–172° C.

EXAMPLE XL

By repeating the reduction procedure of Example XXXIX, except that an equivalent quantity each of the 2-methyl, the 9-chloro, the 9-methoxy and the 9-chloro-11-methyl derivative of 2,3,4,5-tetrahydro-1H-1,4-diazepino[1,2a]indol-1-one is employed as the material to be reduced, the following respective products are obtained:

2,3,4,5-tetrahydro-2-methyl-1H-1,4-diazepino[1,2a]indole (m.p. 98°–100° C.);

9-chloro-2,3,4,5-tetrahydro-1H-1,4-diazepino[1,2a]indole (m.p. 88°–90° C.) and its corresponding hexamate salt (m.p. 170°–172° C., upon recrystallization from ethanol);

9-methoxy-2,3,4,5-tetrahydro-1H-1,4-diazepino[1,2a]indole (m.p. 110°–112° C.) and its corresponding hexamate salt (m.p. 163°–165° C., upon recrystallization from ethanol); and 9-chloro-2,3,4,5-tetrahydro-11-methyl-1H-1,4-diazepino[1,2a]-indole (m.p. of HCl salt: 269°–271° C.).

EXAMPLE XLI

A solution of 2-(dimethylaminopropyl)-2,3,4,5-tetrahydro-9-methoxy-1H-1,4-diazepino[1,2-a]indol-1-one (3 g., 0.00952 mole) in 25 ml. monoglyme is added dropwise to a suspension of lithium aluminum hydride (1.14 g., 0.03 mole) in 100 ml. monoglyme. The mixture is stirred under reflux for 18 hrs., cooled to room temperature and excess hydride decomposed by the careful addition of water. The inorganics are separated by filtration and the filtrate evaporated to a small volume which is dissolved in chloroform. The residual water is separated and the organic layer dried over magnesium sulphate and solvent removed in vacuo to give an amber oily residue of the reduced product, 2-[3-(dimethylamino)propyl]-2,3,4,5-tetrahydro-9-methoxy-1H-1,4-diazepino[1,2-a]indole. Conversion to the hexamate salt and recrystallization twice from acetone yields off-white crystals of 2-[3-(dimethylamino)propyl]2,3,4,5-tetrahydro-9-methoxy-1H-1,4-diazepino[1,2-a]indole dihexamate hydrate, m.p. 132°–134° C.

EXAMPLE XLII

A. The foregoing procedures of Examples XXXVIII through XLI demonstrate the reduction of formula (I–a) compounds to the corresponding formula (I–b) compounds. Accordingly, by following such procedures, except that an equivalent quantity of an appropriate 1-oxo diazepinoindole is employed as the material to be reduced, the following respective derivatives of 2,3,4,5-tetrahydro-1H-1,4-diazepino[1,2a]indole are obtained:

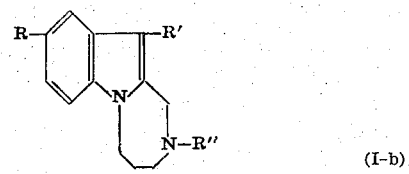

(I-b)

| Compound No. | R | R' | R" |
|---|---|---|---|
| XLIII-a | H | H | Me |
| " b | Cl | H | p-tolyl-Me |
| " c | Cl | H | (Me)₂N-Et |
| " d | MeO | H | (Me)₂N-Et |
| " e |  | H | Be |
| " f | Cl | H | Be |
| " g | MeO | H | Be |
| " h | F | H | H |
| " i | F | Me | H |
| " j | Cl | Ph | H |
| " k | EtO | Et | H |
| " l | MeO | Ph | H |
| " m | F | Et | H |

B. By following the reduction procedures of Examples XXXVIII through XLI, except that an equivalent quantity of each of the 1-oxo-2-$R_1$-9-R-11-R' diazepinoindoles prepared in Example XXXVII (excluding those wherein $R_1$ is a di-(lower alkyl)-amidomethyl substituent) is used as the starting material to be reduced, there are obtained, as respective products, the corresponding 2-R"-9-R-11-R' derivatives of 2,3,4,5-tetrahydro-1H-1,4-diazepino[1,2a]indole (I–b).

EXAMPLE XLIII 2,3,4,5-tetrahydro-11-methyl-1H-1,4-diazepino[1,2-a]-indole (3 g., 0.015 mole) is dissolved in acetic anhydride (10 ml.) and heated on a steam bath for 1 hr. The reaction mixture is then poured into dilute sodium hydroxide and stirred, the resulting solid was filtered and taken up in chloroform. The chloroform solution is dried over magnesium sulfate and evaporated in vacuo. Recrystallization of the residue from benzene-hexane yields 2-acetyl-2,3,4,5-tetrahydro-11-methyl1H-1,4-diazepino[1,2-a]indole, m.p. 160°–162° C.

EXAMPLE XLIV 9-chloro-2,3,4,5-tetrahydro-1H-1,4-diazepino[1,2-a]-indole (6.6 g., 0.03 mole) is heated on a steam-bath for 3 hrs. with 50 ml. acetic anhydride. The reaction mixture is concentrated under reduced pressure, dissolved in chloroform and shed with sodium hydroxide solution. The organic layer is washed with water and dried over anhydrous magnesium sulphate. Removal of the solvent in vacuo and crystallization of the resulting oil from aqueous ethanol affords 2-acetyl-9-chloro- 2,3,4,5-tetrahydro-1H-1,4-diazepino[1,2-a]indole, m.p. 135°–136.5° C.

EXAMPLE XLV 9-chloro-2,3,4,5-tetrahydro-1H-1,4-diazepino[1,2-a]-indole (4.0 g., 0.0181 mole) is dissolved in 200 ml. acetone containing 20 g. anhydrous potassium carbonate. Butyryl chloride (2.0 g., 0.0192 mole) is added and the mixture is stirred overnight at room temperature. The precipitate is removed by filtration and washed with chloroform. The washings and the acetone filtrate are combined and evaporated in vacuo. The residue is dissolved in chloroform and the solution washed successively with dilute hydrochloric acid, water, dilute sodium hydroxide and water and then dried over magnesium sulphate. Removal of the solvent affords an amber oil that is purified by filtration through alumina (chloroform-ether, 1:1, as eluant) and crystallized from benzene-hexane as a pale yellow solid, 2-butyryl-9-chloro-2,3,4,5-tetrahydro-1H-1,4-diazepino[1,2-a]indole, m.p. 114°–115° C.

EXAMPLE XLVI 9-chloro-2,3,4,5-tetrahydro-11-methyl-1H-1,4-diazepino[1,2-a]indole (4 g., 0.017 mole) is dissolved in acetic anhydride (20 ml.) and heated on a steam bath for 1 hr. The reaction mixture is poured onto dil. sodium hydroxide and stirred. This mixture is extracted with chloroform and the chloroform extract is dried over magnesium sulfate and evaporated in vacuo to give a dark oil. The oil is dissolved in 5 ml. benzene and chromatographed on 50 g. Woelm neutral alumina (activity grade 1) the elution being carried out with benzene. The solid obtained is recrystallized from aqueous ethanol to yield 2-acetyl-9-chloro-2,3,4,5-tetrahydro-11-methyl-1H-1,4-diazepino[1,2-a]indole as a white powder, m.p. 120°–122° C.

EXAMPLE XLVII

The procedures of Examples XLIII through XLVI demonstrate the general method of acylating the 9-R-11-R-2-unsubstituted compounds of formula (I–b) to yield the corresponding 2-lower alkanoyl derivatives. Accordingly, by following such procedures, except that equivalent quantities are used of an appropriate acylating agent and an appropriate 2-unsubstituted formula (I–b) compound to be acylated, the following respective products are obtained:

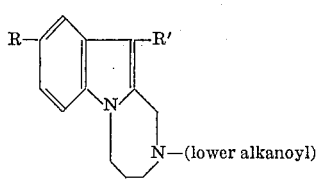

| Compound No. | R | R' | Alkanoyl |
|---|---|---|---|
| XLVII-a | H | H | acetyl |
| " b | H | H | isopropionyl |
| " c | MeO | H | acetyl |
| " d | MeO | H | n-butyryl |
| " e | H | Me | n-butyryl |
| " f | Cl | Me | isopropionyl |
| " g | F | H | acetyl |
| " h | F | Me | acetyl |
| " i | Cl | Ph | n-propionyl |
| " j | EtO | Et | acetyl |
| " k | MeO | Ph | acetyl |
| " l | F | Et | n-butyryl |

We claim:
1. A lower alkyl 1-(3-acetamidopropyl)-3-R'-5-R-indole-2-carboxylate having the formula:

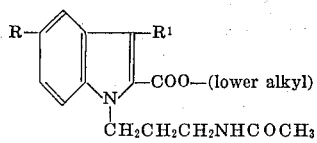

wherein R is a member selected from the group consisting of hydrogen, lower alkoxy, chloro and fluoro; and R' is a member selected from the group consisting of hydrogen, lower alkyl and phenyl.

2. The carboxylates of claim 1 wherein lower alkyl is ethyl.

3. A lower alkyl 1-(3-aminopropyl)-3-phenyl-5-R-indole-2-carboxylate having the formula:

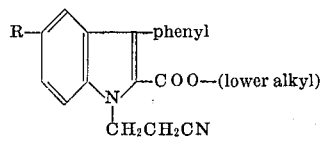

wherein R is a member selected from the group consisting of hydrogen, lower alkoxy, chloro and fluoro.

4. The carboxylates of claim 3 wherein lower alkyl is ethyl.

5. A lower alkyl 1-cyanoethyl-3-phenyl-5-R-indole-2-carboxylate having the formula:

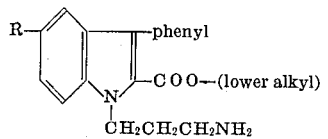

wherein R is a member selected from the group consisting of hydrogen, lower alkoxy, chloro and fluoro.

6. The carboxylates of claim 5 wherein lower alkyl is ethyl.

* * * * *